US010451109B1

(12) United States Patent
Arruda et al.

(10) Patent No.: US 10,451,109 B1
(45) Date of Patent: Oct. 22, 2019

(54) LINEAR GUIDE BEARING AND ASSOCIATED QUICK-CHANGE SYSTEM

(71) Applicant: SCHAEFFLER TECHNOLOGIES AG & CO. KG, Herzogenaurach (DE)

(72) Inventors: Joao Vitor Valentin Arruda, Sorocaba-SP (BR); Thomas Nogueira da Silva, Piedade (BR); Danillo Gomes Martins de Araujo, Sorocaba-SP (BR)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 15/956,320

(22) Filed: Apr. 18, 2018

(51) Int. Cl.
*F16C 29/06* (2006.01)
*B23Q 1/25* (2006.01)
*F16C 29/00* (2006.01)
*B23Q 1/56* (2006.01)
*B23Q 3/06* (2006.01)

(52) U.S. Cl.
CPC ............ *F16C 29/0671* (2013.01); *B23Q 1/25* (2013.01); *F16C 29/005* (2013.01); *F16C 29/063* (2013.01); *F16C 29/0676* (2013.01); *B23Q 1/56* (2013.01); *B23Q 3/06* (2013.01)

(58) Field of Classification Search
CPC .. F16C 29/005; F16C 29/063; F16C 29/0671; F16C 29/0676; B23Q 1/03; B23Q 1/25; B23Q 1/28; B23Q 1/56; B23Q 3/06
USPC ........ 384/7, 10, 21–22, 26, 41, 45; 108/143; 408/146, 159, 186, 199, 239 R, 241 S; 409/167, 174, 178
See application file for complete search history.

(56) References Cited

U.S. PATENT DOCUMENTS

| 3,572,680 | A | * | 3/1971 | Neff | B23Q 1/28 |
| | | | | | 108/143 |
| 3,614,909 | A | * | 10/1971 | Rolf-Dieter Neuser | |
| | | | | | B23Q 17/2233 |
| | | | | | 33/628 |
| 4,770,575 | A | * | 9/1988 | Kolblin | B23Q 3/18 |
| | | | | | 279/133 |
| 4,838,515 | A | * | 6/1989 | Prentice | B23Q 1/48 |
| | | | | | 248/419 |

(Continued)

FOREIGN PATENT DOCUMENTS

| DE | 10249968 A1 | * | 5/2004 | ............ F16C 29/005 |
| DE | 202015007147 U1 | * | 12/2015 | ............. B23Q 1/012 |
| EP | 0305767 A2 | * | 3/1989 | ............... B23Q 1/28 |

OTHER PUBLICATIONS

Ricardo Antunes et al.; Quicker Reaction, Lower Variability: The Effect of Transient Time in Flow Variability of Project-Driven Production; 24rd Ann. Conf. of the Int'l Group for Lean Construction at Boston, MA; Jul. 21, 2016; pp. 72-83.

*Primary Examiner* — Marcus Charles
(74) *Attorney, Agent, or Firm* — Brooks Kushman P.C.

(57) ABSTRACT

A linear guide bearing and an associated quick-connect system are provided. The linear guide bearing includes a carriage that moves linearly along a guide rail. The carriage includes an upper surface having a groove defined therein, and a depression formed in the groove. A tool is configured to connect to the carriage in a quick-connect fashion. To do so, the tool has a spring-loaded plunger biased downward toward the carriage. As the tool is slid along the groove of the carriage, the tip of the plunger is biased to depress into the depression in the groove. To release the tool from the carriage, a force can be applied sufficient to overcome the spring-bias force to allow the tool to lift off from the carriage.

20 Claims, 6 Drawing Sheets

(56) References Cited

U.S. PATENT DOCUMENTS

| | | | | |
|---|---|---|---|---|
| 5,341,751 | A * | 8/1994 | Cuneo | B23Q 1/01 |
| | | | | 108/143 |
| 5,533,844 | A * | 7/1996 | Ekleberry | B23Q 1/601 |
| | | | | 108/143 |
| 5,678,928 | A * | 10/1997 | Agari | B23Q 1/0063 |
| | | | | 384/45 |
| 6,126,389 | A * | 10/2000 | Burdgick | F01D 11/24 |
| | | | | 415/115 |
| 6,609,679 | B1 * | 8/2003 | Seidel | F16B 2/14 |
| | | | | 244/1 R |
| 7,252,466 | B1 * | 8/2007 | Roch | B23Q 17/2233 |
| | | | | 33/638 |
| 7,287,906 | B2 * | 10/2007 | Wasson | F16C 29/008 |
| | | | | 384/12 |
| 7,665,200 | B1 * | 2/2010 | Shimooka | B23Q 1/626 |
| | | | | 29/560 |
| 8,807,885 | B2 * | 8/2014 | Herbold | B23B 41/00 |
| | | | | 408/1 R |
| 2010/0018950 | A1 * | 1/2010 | Aoki | G03F 7/70716 |
| | | | | 216/41 |
| 2012/0152050 | A1 * | 6/2012 | Richardson | B25J 9/023 |
| | | | | 74/490.02 |

\* cited by examiner

US 10,451,109 B1

LINEAR GUIDE BEARING AND ASSOCIATED QUICK-CHANGE SYSTEM

TECHNICAL FIELD

The present disclosure relates to a quick-change system for a linear guide bearing.

BACKGROUND

Linear guide bearings are known in the art and typically include a carriage that moves along a guide rail. Linear guide bearings may incorporate a plain bearing, roller bearing, etc. to move the carriage relative to the guide rail. In the case of a linear guide roller bearing, the carriage serves as a guide and is guided along the rail over roll bodies such as balls or rollers. Linear guide bearings may be used in several applications, including machine tools, industrial machines, conveyance apparatuses, robots, and measurement instruments.

SUMMARY

In one embodiment, a quick-connect system for a linear guide bearing is provided. The system includes a linear bearing carriage having an upper surface and a lower surface, the lower surface defining a first groove configured to receive a guide rail to enable linear movement of the linear bearing carriage along the guide rail in an axial direction. The upper surface defines a second groove and a depression formed in the upper surface within the second groove. The linear bearing carriage further has a peg extending from the upper surface and within the second groove. A tool is configured to attach to the linear bearing carriage via a quick-connect coupling. The tool has at least one rail configured to engage with the second groove to enable the tool to slide relative to the linear bearing carriage in a sliding manner during assembly of the tool to the linear bearing carriage. The tool has a plunger assembly with a tip that is spring-biased toward the upper surface of the linear bearing carriage. The tool has an opening at one axial end thereof and a wall within the opening. Movement of the tool relative to the carriage in the axial direction forces the wall to contact the peg, and forces the tip of the plunger assembly into the depression formed in the upper surface of the carriage to provide a quick-connect between the tool and the linear bearing carriage.

In another embodiment, a linear guide bearing includes a carriage having an upper surface and a lower surface, with the lower surface defining a lower groove configured to slidably engage with a guide rail, and the upper surface defining an upper groove extending in a transverse direction from the lower groove. The upper surface further defines a depression in the upper groove. A tool is configured to slide within the upper groove of the carriage during assembly with the carriage. The tool has an extendable plunger biased in a direction toward the carriage. The plunger includes a tip that extends into the depression when the plunger is aligned with the depression during assembly to establish a quick-connect coupling between the tool and the carriage.

According to yet another embodiment, a linear guide bearing includes a carriage having a lower surface, an upper surface, and a peg extending from the upper surface. The lower surface defines a lower groove extending along a first direction and configured to sildably engage with a guide rail. The upper surface defines an upper groove extending along a second direction transverse to the first direction. The peg is located within the upper groove. A tool is configured to slide within the upper groove of the carriage during assembly with the carriage. The tool has an end surface facing the second direction during assembly. The end surface defines a pocket extending partially into the tool. The pocket is sized to receive the peg when the tool is slid along the upper groove during assembly.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain directional terms may be used in this disclosure. It should be understood that those directional terms are for illustrative purposes in explaining the structure in the orientation shown in the Figures. For example, terms such as "upper," "lower," "inner," "outer," "top," "bottom," "upward," "downward," etc. are terms that refer to the orientation of the structure as shown in the Figures.

Figure 1:
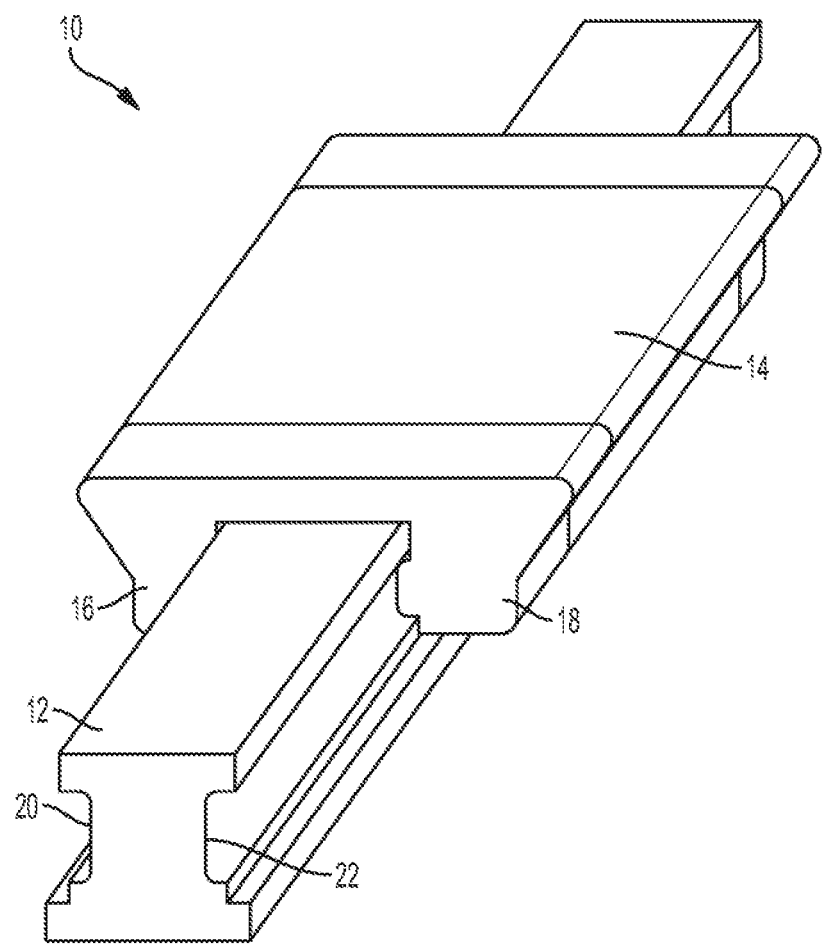
FIG. 1 is a perspective view of a prior art linear guide bearing.

FIG. 1 is an example of a typical linear guide bearing 10. The linear guide bearing includes a linear bearing rail (also referred to as a guide rail) 12 and a linear bearing carriage (also referred to as a carriage) 14. The carriage 14 is supported for linear movement along the guide rail 12. In particular, the carriage 14 has a generally U-shaped cross-sectional profile and is clamped around the guide rail 12 with two legs 16, 18 extending into corresponding grooves 20, 22 of the guide rail. The legs 16, 18 may include roller bodies that contact the surfaces of the grooves 20, 22 to reduce friction during linear movement of the carriage 14 relative to the guide rail 12.

Figure 2:
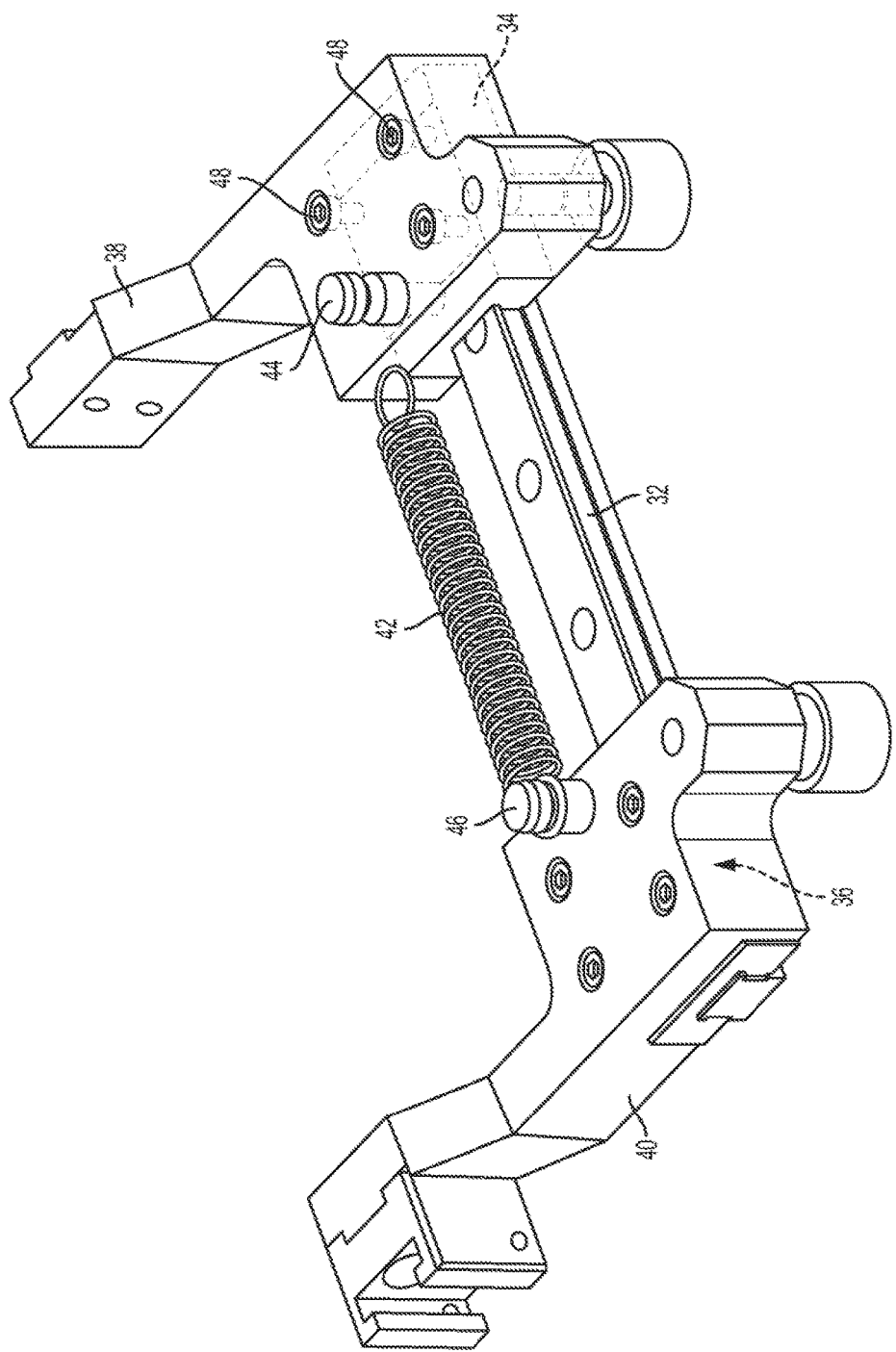
FIG. 2 is a perspective view of a prior art system in which a tool is fastened to a linear guide bearing using bolts.

FIG. 2 illustrates a linear guide bearing system with tools attached to the linear guide bearings for a typical use application of linear guide gearings. As in FIG. 1, a guide rail 32 supports a carriage 34 for linear movement. In this illustration, a second carriage 36 is provided. Each carriage 34, 36 has an associated tool 38, 40 attached thereto, which may be connected to each other via a spring 42 and pegs 44, 46, for example. The tools 38, 40 can be part of a machine tool, industrial machine, conveyance apparatuses, robotic assembly, or a measurement instrument, for example.

The attachment between the tools and the linear guide bearings can be cumbersome. For example, the tool 38 may be fastened (by, for example, a plurality of bolts 48) to the carriage 34 while the carriage is attached to the guide rail 32. In some applications it may be desirable to change out the tools 38, 40 for other tools to be attached to the linear guide bearing. For example, if the tools 38, 40 are of a certain dimension suitable for one use, it may be desirable to remove the tools 38, 40 and replace them with tools having a certain dimension suitable for another use. To do so, an operator must unfasten the tools 38, 40 from the carriages 34, 36 by removing the bolts. Then, the new tools are aligned with the carriages 34, 36, and bolts are once again used to fasten the new tools to the carriages. The entire process to remove and replace tools to the linear guide bearings may take several minutes.

Therefore, according to various embodiments of this disclosure, an improved linear guide bearing is provided with structure enabling a quick-change system. As will be explained below, the carriage of the linear guide bearing is provided with a depression or aperture, and the tool is provided with a spring-loaded plunger that engages the depression or aperture when properly located. No bolts or other external fasteners are required. Instead, a user can simply attach the tool to the carriage by aligning the two parts until the plunger engages the carriage.

Figure 3A:
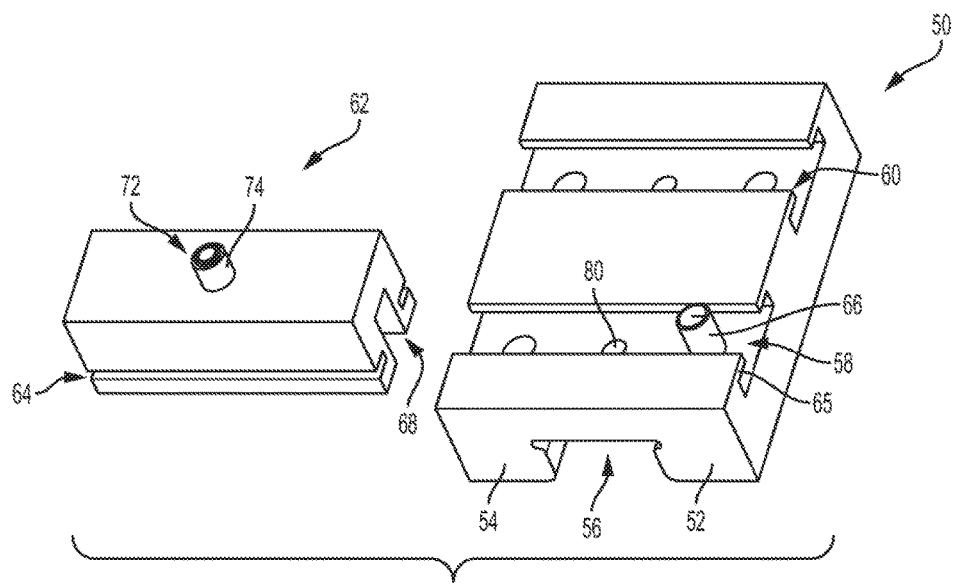
FIG. 3A is a disassembled perspective view of a linear bearing quick-change system, according to one embodiment, in which the tool is releasably secured to the linear bearing carriage without fasteners.
Figure 3B:
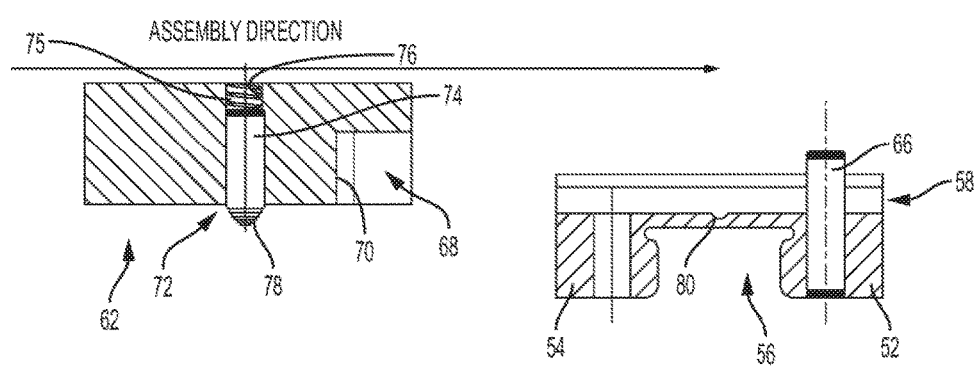
FIG. 3B is a cross-sectional view of the quick-change system of FIG. 3A, with a plunger assembly driven vertically through the tool, according to one embodiment.

FIG. 3A shows one embodiment of a quick-change linear guide bearing system in a disassembled state, and FIG. 3B is a cross-sectional view of the system. A linear bearing carriage 50 includes a pair of legs 52, 54 defining a lower groove 56 therebetween. The lower groove 56 is formed on the underside of the carriage 50 for receiving the guide rail (not shown). On its upper side, the carriage 50 includes a first groove 58 and a second groove 60 (which may be referred to as upper grooves). Each groove 58, 60 extends from the upper surface and partially toward the lower surface of the carriage 50.

The grooves 58, 60 are each sized and configured to receive a corresponding tool 62. In one example, the grooves 58, 60 each are T-shaped to receive a corresponding T-shape profile or portion of the tool 62. This vertically constrains the tool 62 with the carriage 50. The tool 62 can be assembled to the carriage 50 by sliding along one of the grooves 58, 60. The tool 62 may also have a pair of linear tracks 64 that receive corresponding linear guide rails 65 extending along the grooves 58, 60. This further facilitates the sliding of the tool 62 along the carriage 50.

Figure 4:
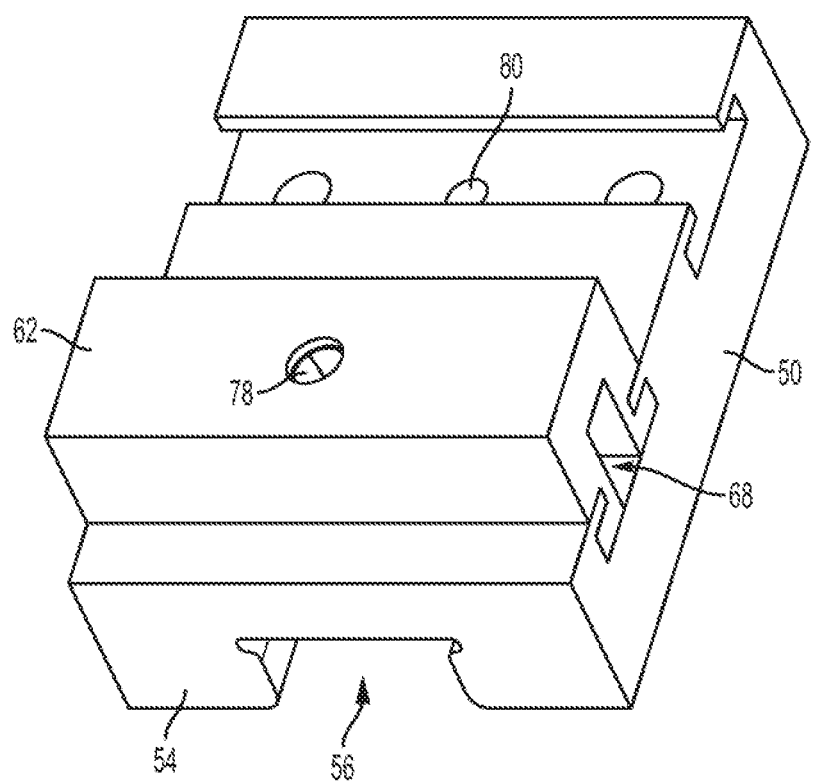
FIG. 4 is an assembled perspective view of the linear bearing quick-change system of FIGS. 3A-3B, according to one embodiment.

The assembly also includes structure to laterally constrain the tool 62 to the carriage 50. A peg or pin 66 extends vertically from the carriage 50. The peg 66 may be adhered, fastened, or otherwise fixed to the carriage 50. In the embodiment shown in FIG. 3B, the peg 66 extends entirely vertically through the carriage 50. The tool is provided with an opening 68 at one lateral end thereof. The opening 68 may be a cavity or pocket that does not extend entirely through the tool 62. The opening 68 is bound on one lateral side by a wall 70. The wall 70 is configured to contact the peg 66 as the tool 62 is slid along the groove 58. As such, the peg 66 acts as a stop to laterally inhibit further movement of the tool 62 relative to the carriage 50. The wall 70 of the opening 68 may be located and positioned such that when the peg 66 contacts the wall 70 to inhibit further sliding movement, the lateral end of the tool 62 aligns with the lateral end of the carriage 50, as shown in FIG. 4. This provides the user with feedback that the tool 62 is properly positioned relative to the carriage 50 during assembly of the tool 62 and the carriage 50.

The tool 62 is also provided with a plunger assembly 72. The plunger assembly 72 may include a peg or piston 74 that is biased downward by, for example, a spring 75. In one embodiment, the tool 62 includes an aperture 76 extending from the top surface of the tool to the bottom surface of the tool. In another embodiment, the aperture 76 is a pocket that does not extend entirely to the upper surface of the tool 62. The piston 74 is housed or contained within the aperture 76 and can slide along the inner surfaces of the aperture 76. The piston 74 is spring-biased downward through the aperture 76 and toward the upper surface of the carriage 50.

The piston 74 has a tip 78 that may be rounded. The carriage 50 has a corresponding surface feature (e.g., indent, aperture, depression, or the like) configured to receive the tip 78 of the piston 74. In the illustrated embodiment, the surface feature is a depression 80. As the tool 62 is slid along at least one of the grooves 58, 60, the piston 74 is biased toward the carriage 50. Once the wall 70 of the tool 62 reaches the peg 66, the piston 74 is able to drive downward into the depression 80. This constrains relative movement between the tool 62 and the carriage 50. Simultaneously, the wall 70 may contact the peg 66 to further constrain linear movement of the tool 62 relative to the carriage 50.

The combination of the piston assembly 72 and the depression 80, along with the peg 66 contacting the wall 70, locks the tool 62 to the carriage in a quick-connect manner. The assembled tool and carriage (as shown in FIG. 4) can now slide along the guide rail 12 during normal operation. If the operator wishes to replace the tool 62 with another tool, the operator can quickly and easily remove the tool 62 from the carriage by providing enough upward force to counter-act the spring load that presses the piston 74 into the depression 80, and then sliding the tool 62 linearly along the grooves 58, 60.

Figure 5:
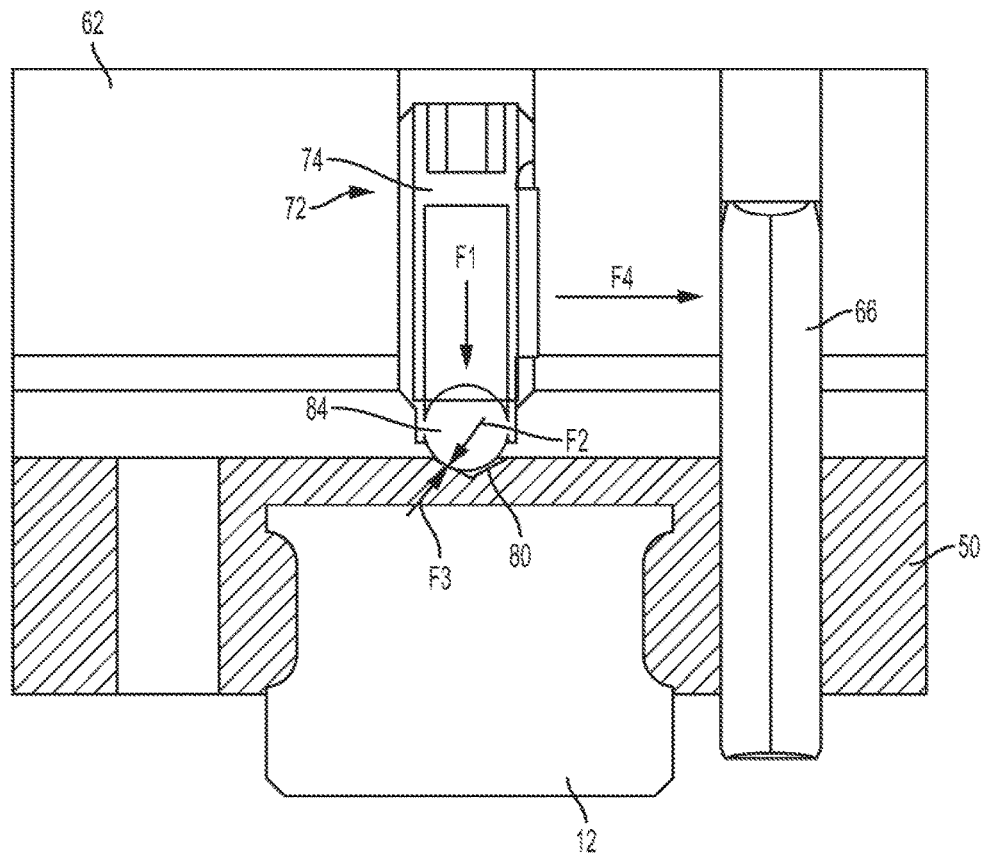
FIG. 5 is a cross-sectional view of the linear bearing quick-change system of FIG. 4, assembled to a guide rail, according to one embodiment.

FIG. 5 shows a cross-sectional view of the tool and carriage assembly attached to the guide rail 12. Force arrows are also shown to illustrate the various forces acting on the quick-connect attachment between the tool 62 and the carriage 50. In this embodiment, the plunger assembly 72 includes a ball 84 at its lower tip. The plunger assembly 72 includes a piston or plunger that provides a spring load on the ball (represented by force arrow F1). Once the tool 62 is properly aligned relative to the carriage 50, the force F1 presses the ball 84 into the depression 80 (which is illustrated as V-shaped in this embodiment.) This causes a resulting ball-load force (represented by force arrow F2) against at least one of the surfaces of the depression 80. A counterforce (represented by force arrow F3) acts on the ball 84. Finally, a linear force (represented by force arrow F4) is provided on the peg 66 via the contacting wall 70. These forces act in cooperation to provide a quick-connect coupling between the tool 62 and the carriage 50 without the need for additional fasteners such as the bolts 48 shown in FIG. 1. To disassemble the tool 62 from the carriage 50, a force must be provided in a direction opposite to the direction of the force F1 to overcome the spring bias force. This can be accomplished using an external tool, or by hand.

Figure 6:
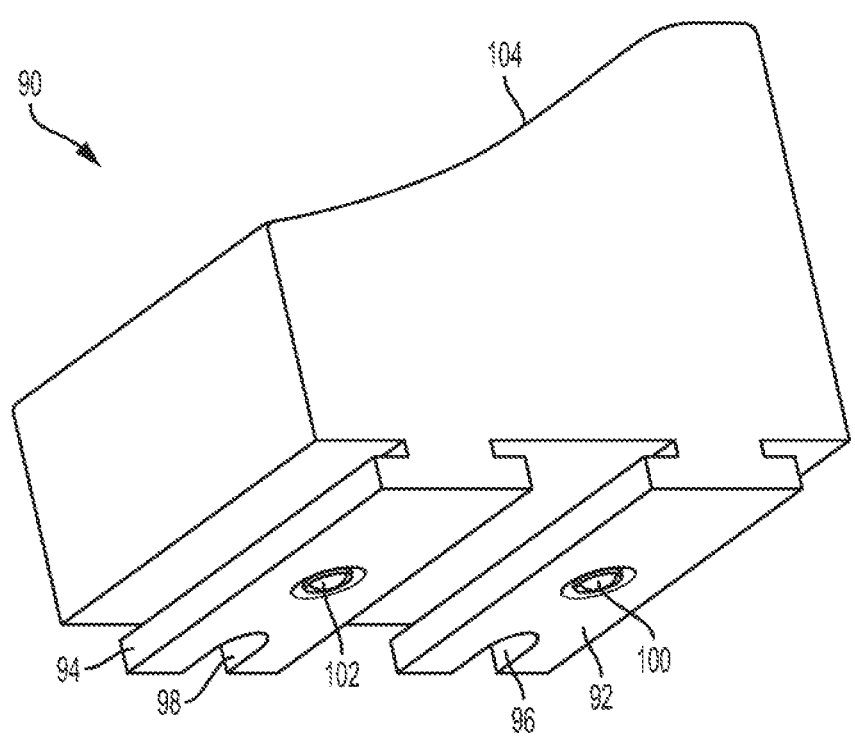
FIG. 6 is a perspective view, from underneath, of a linear bearing carriage according to one embodiment.

FIG. 6 shows another embodiment of a tool 90 configured to quick-connect couple to the carriage 50. The tool 90 includes a pair of rails 92, 94 that are, once again, T-shaped to conform to the corresponding T-shaped grooves 58, 60. The rails 92, 94 maybe integrally formed with the remaining main body of the tool 90. Each rail is provided with a respective opening 96, 98 having an interior wall configured to engage a respective pin 66 in each groove 58, 60. Each rail 92, 94 is also provided with a respective spring-biased plunger assembly 100, 102 configured to engage the depressions 80 in the carriage 50, as described above.

According to the illustrated embodiment, the tool 90 has an elevated and rounded upper surface 104. When the tool 90 is attached to the carriage 50, the carriage and tool assembly can glide along the guide rail 12. In one use, the upper surface 104 may contact an apparatus such as a roller or lever to activate some external function. In other words, as the carriage and tool assembly is slid along the guide rail 12, the shape of the tool 90 may force an external roller up the rounded upper surface 104. An operator may desire to remove and replace the tool 90 with an upper surface that has a different rounded profile than the upper surface 104 of tool 90. The operator may therefore quickly remove the tool 90 from the carriage according to the methods described above, and replace the tool 90 with another tool having a differently-profiled upper surface.

The entire process of removing one tool from the carriage and replacing it with another tool can take a matter of seconds (e.g., 3-10 seconds). This is due to the nature of the quick-connect coupling described herein. This is a vast improvement over prior art linear guide bearings that may require several minutes to remove the tool by removing bolts or other fasteners, and attaching another tool by re-attaching bolts or other fasteners.

PARTS LIST

The following is a list of components labeled in the Figures; however, these terms are not intended to be limited to only the embodiments shown in the Figures.

10 linear guide bearing
12 guide rail
14 carriage
16 leg
18 leg
20 groove
22 groove
32 guide rail
34 carriage
36 carriage
38 tool
40 tool
42 spring
44 peg
46 peg
48 bolt
50 carriage
52 leg
54 leg
56 lower groove
58 first upper groove
60 second upper groove
62 tool
64 linear track
65 guide rail
66 peg
68 opening
70 wall
72 plunger assembly
74 peg or piston
75 spring
76 aperture
78 tip
80 depression
84 ball
90 tool
92 rail
94 rail
96 opening
98 opening
100 plunger assembly
102 plunger assembly
104 upper surface While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A quick-connect system for a linear guide bearing, the system comprising:

a linear bearing carriage having an upper surface and a lower surface, the lower surface defining a first groove configured to receive a guide rail to enable linear movement of the linear bearing carriage along the guide rail in an axial direction, the upper surface defining a second groove and a depression formed in the upper surface within the second groove, the linear bearing carriage further having a peg extending from the upper surface and within the second groove; and a tool configured to attach to the linear bearing carriage via a quick-connect coupling, the tool having at least one rail configured to engage with the second groove to enable the tool to slide relative to the linear bearing carriage in a sliding manner during assembly of the tool to the linear bearing carriage, the tool having a plunger assembly with a tip, wherein at least a portion of the plunger assembly is spring-biased toward the upper surface of the linear bearing carriage, and the tool having an opening at one axial end thereof and a wall within the opening;

wherein movement of the tool relative to the carriage in the axial direction forces the wall to contact the peg, and forces the tip of the plunger assembly into the depression formed in the upper surface of the carriage to provide a quick-connect between the tool and the linear bearing carriage.

2. The system of claim 1, wherein the linear bearing carriage and the tool are connected to each other without additional fasteners.

3. The system of claim 1, wherein the plunger assembly includes a piston and a spring that biases the piston downward toward the linear bearing carriage.

4. The system of claim 3, wherein the plunger assembly further includes a ball defining the tip of the plunger assembly, wherein the ball contacts the depression of the upper surface of the carriage when the tool is assembled to the linear bearing carriage.

5. The system of claim 1, wherein the depression in the upper surface of the linear hearing carriage is vertically aligned with the first groove.

6. The system of claim 1, wherein the linear bearing carriage includes a pair of legs, each leg located on either side of the first groove, wherein the peg is vertically aligned with one of the legs.

7. A linear guide hearing comprising:
a carriage having an upper surface and a lower surface, the lower surface defining a lower groove configured to slidably engage with a guide rail, the upper surface defining an upper groove extending in a transverse direction from the lower groove, and the upper surface further defining a depression in the upper groove; and
a tool configured to slide within the upper groove of the carriage during assembly with the carriage, the tool having an extendable plunger biased in a direction toward the carriage, wherein the plunger includes a tip that extends into the depression when the plunger is aligned with the depression during assembly to establish a quick-connect coupling between the tool and the carriage.

8. The linear guide bearing of claim 7, wherein the tip is part of a ball coupled to the plunger.

9. The linear guide hearing of claim 7, further comprising a spring configured to bias the plunger toward the carriage.

10. The linear guide bearing of claim 9, wherein the tool defines an aperture, and the plunger and spring are disposed in the aperture.

11. The linear guide bearing of claim 9, wherein the spring provides a first force in the direction toward the carriage, and disassembly of the tool from the carriage requires an application of a second force that exceeds the first three in a direction opposite the first force.

12. The linear guide bearing of claim 7, wherein the carriage includes a peg extending upward from the upper surface, the peg located within the upper groove.

13. The linear guide bearing of claim 12, wherein the tool includes a pocket at one axial end, the pocket being sized to receive the peg when the tool is slid along the upper groove during assembly.

14. The linear guide bearing of claim 13, wherein the carriage includes an inner wall within the pocket, the inner wall configured to contact the peg when the plunger is aligned with the depression during assembly.

15. A linear guide bearing comprising:
a carriage having
a lower surface defining a lower groove configured to sildably engage with a guide rail, the lower groove extending, along a first direction,
an upper surface defining an upper groove extending along a second direction transverse to the first direction, and
a peg extending upward from the upper surface, the peg located within the upper groove; and
a tool configured to slide within the upper groove of the carriage during assembly with the carriage, the tool having an end surface facing the second direction during assembly, wherein a pocket extends from the end face and partially into the tool, wherein the pocket is sized to receive the peg when the tool is slid along the upper groove during assembly.

16. The linear guide bearing of claim 15, wherein the tool includes an inner wall within the pocket, and the peg contacts the inner wall to inhibit further movement of the tool along the second direction during assembly.

17. The linear guide bearing of claim 15, wherein the carriage includes a pair of legs with the lower groove separating the legs, wherein the peg is vertically aligned with one of the legs.

18. The linear guide bearing of claim 15, wherein the tool includes a plunger assembly spring-biased toward the carriage.

19. The linear guide bearing of claim 18, wherein the plunger assembly includes a plunger, a spring biasing the plunger toward the carriage, and a tip configured to engage a depression formed in the carriage.

20. The linear guide bearing of claim 19, wherein the depression is formed in the upper groove of the carriage and vertically aligned with the lower groove of the carriage.

* * * * *